United States Patent
Pohja et al.

(10) Patent No.: US 10,764,154 B2
(45) Date of Patent: *Sep. 1, 2020

(54) AD-HOC CONNECTION BETWEEN ELECTRONIC DEVICES

(71) Applicant: Nokia Technologies Oy, Espoo (FI)

(72) Inventors: Seppo Pohja, Tampere (FI); Juha Hietasarka, Suinula (FI); Holger Hussmann, Tampere (FI)

(73) Assignee: Nokia Technologies Oy, Espoo (FI)

(*) Notice: Subject to any disclaimer, the term of this patent is extended or adjusted under 35 U.S.C. 154(b) by 228 days.

This patent is subject to a terminal disclaimer.

(21) Appl. No.: 15/594,798

(22) Filed: May 15, 2017

(65) Prior Publication Data

US 2017/0249035 A1    Aug. 31, 2017

Related U.S. Application Data

(63) Continuation of application No. 14/098,807, filed on Dec. 6, 2013, now Pat. No. 9,794,133, which is a
(Continued)

(51) Int. Cl.
*H04M 1/725* (2006.01)
*G06F 3/048* (2013.01)
(Continued)

(52) U.S. Cl.
CPC ............. *H04L 41/22* (2013.01); *G06F 3/048* (2013.01); *H04M 1/7253* (2013.01); *H04W 4/21* (2018.02);
(Continued)

(58) Field of Classification Search
CPC .................................................. H04M 1/7253
(Continued)

(56) References Cited

U.S. PATENT DOCUMENTS 5,363,507 A    11/1994 Nakayama et al.
5,553,075 A *  9/1996 Westin .................. H04W 76/10
                                                    370/349
(Continued)

FOREIGN PATENT DOCUMENTS

EP    1220501    3/2002
EP    1255383    6/2002
(Continued)

OTHER PUBLICATIONS

Kortuem, G., et al., "Close Encounters: Supporting Mobile Collaboration through Interchange of User Profiles", H.-W. Gellersen (Ed.): HUC'99, LNCS 1707, 1999, pp. 171-185.

*Primary Examiner* — Daniel Rodriguez
(74) *Attorney, Agent, or Firm* — Locke Lord LLP

(57) ABSTRACT

The invention relates to a method of creating an ad-hoc connection between two electronic devices. In order to enable a particularly user-friendly creation of such a connection, it is proposed that a first device detects a hugging state between the first device and a second device, in which the first device and the second device are in close vicinity and a piece of information is received at the first device directly from the second device. In case a hugging state is detected, a handle is obtained proceeding from the received piece of information. The handle comprises an address of some device other than the first device. Finally, a communication channel is established between the first device and the other device using the address included in the handle. The invention relates equally to a corresponding device, to an expandable framework for such a device, and to a corresponding software program product.

24 Claims, 8 Drawing Sheets

Related U.S. Application Data continuation of application No. 10/773,765, filed on Feb. 5, 2004, now Pat. No. 8,639,819.

(51) Int. Cl.
  *H04L 12/24* (2006.01)
  *H04W 4/21* (2018.01)
  *H04W 76/10* (2018.01)
  *H04W 8/26* (2009.01)
  *H04W 84/18* (2009.01)
  *H04W 24/00* (2009.01)

(52) U.S. Cl.
  CPC ............ *H04W 8/26* (2013.01); *H04W 76/10* (2018.02); *H04W 84/18* (2013.01); *H04W 24/00* (2013.01)

(58) Field of Classification Search
  USPC ....................................................... 715/736
  See application file for complete search history.

(56) References Cited

U.S. PATENT DOCUMENTS

| | | |
|---|---|---|
| 5,907,324 A | 5/1999 | Larson et al. |
| 6,005,575 A * | 12/1999 | Colleran ............... G06F 9/451 715/807 |
| 6,085,151 A | 7/2000 | Farmer et al. |
| 6,275,932 B1 | 8/2001 | Yamaguchi et al. |
| 6,401,115 B1 | 6/2002 | Dichter |
| 6,404,154 B2 | 6/2002 | Marcinkiewicz et al. |
| 6,512,928 B1 | 1/2003 | Janky et al. |
| 6,575,753 B2 | 6/2003 | Rosa et al. |
| 6,580,418 B1 | 6/2003 | Grome et al. |
| 6,601,093 B1 | 7/2003 | Peters |
| 6,628,938 B1 | 9/2003 | Rachabathuni et al. |
| 6,710,701 B2 | 3/2004 | Leatherman |
| 6,711,401 B1 | 3/2004 | Chow et al. |
| 6,717,382 B2 | 4/2004 | Graiger et al. |
| 6,791,471 B2 | 9/2004 | Wehner et al. |
| 6,795,410 B1 | 9/2004 | Janky et al. |
| 6,823,199 B2 | 11/2004 | Gough |
| 6,832,251 B1 | 12/2004 | Gelvin et al. |
| 6,842,433 B2 | 1/2005 | West et al. |
| 6,853,293 B2 | 2/2005 | Swartz et al. |
| 6,867,965 B2 | 3/2005 | Khoo |
| 6,873,245 B2 | 3/2005 | del Castillo et al. |
| 6,888,536 B2 | 5/2005 | Westerman et al. |
| 6,895,310 B1 | 5/2005 | Kolls |
| 6,901,057 B2 | 5/2005 | Rune et al. |
| 6,914,887 B2 | 7/2005 | Idsinga |
| 6,924,787 B2 | 8/2005 | Kramer et al. |
| 6,944,457 B2 * | 9/2005 | Alinikula ............... H04L 1/1664 370/431 |
| 6,947,943 B2 | 9/2005 | DeAnna et al. |
| 6,961,541 B2 | 11/2005 | Overy et al. |
| 6,961,668 B2 | 11/2005 | Bodin et al. |
| 6,965,948 B1 | 11/2005 | Eneborg et al. |
| 6,973,324 B2 | 12/2005 | Weisshaar et al. |
| 6,978,181 B1 | 12/2005 | Snell |
| 6,996,374 B1 | 2/2006 | Bao et al. |
| 7,002,473 B2 | 2/2006 | Glick et al. |
| 7,009,511 B2 | 3/2006 | Mazar et al. |
| 7,020,701 B1 | 3/2006 | Gelvin et al. |
| 7,024,228 B2 | 4/2006 | Komsi et al. |
| 7,031,798 B2 | 4/2006 | Brown et al. |
| 7,035,906 B1 | 4/2006 | Ellis, III |
| 7,036,128 B1 | 4/2006 | Julia et al. |
| 7,038,123 B2 | 5/2006 | Ludwig |
| 7,038,661 B2 | 5/2006 | Wilson et al. |
| 7,072,975 B2 | 7/2006 | Kato |
| 7,084,859 B1 | 8/2006 | Pryor |
| 7,091,827 B2 | 8/2006 | Stilp |
| 7,092,671 B2 | 8/2006 | Lunsford et al. |
| 7,098,891 B1 | 8/2006 | Pryor |
| 7,103,359 B1 | 9/2006 | Heinonen et al. |
| 7,103,661 B2 | 9/2006 | Klein |
| 7,123,878 B1 * | 10/2006 | Heinonen ............ G06Q 20/382 455/41.2 |
| 7,127,300 B2 | 10/2006 | Mazar et al. |
| 7,127,370 B2 | 10/2006 | Kelly et al. |
| 7,151,764 B1 | 12/2006 | Heinonen et al. |
| 7,199,790 B2 | 4/2007 | Rosenberg et al. |
| 7,216,109 B1 | 5/2007 | Donner |
| 7,224,698 B2 | 5/2007 | Kreiner et al. |
| 7,236,742 B2 | 6/2007 | Hall et al. |
| 7,243,053 B1 | 7/2007 | Small |
| 7,246,009 B2 | 7/2007 | Hamblen et al. |
| 7,248,570 B2 | 7/2007 | Bahl et al. |
| 7,251,231 B2 | 7/2007 | Gubbi |
| 7,253,803 B2 | 8/2007 | Schena et al. |
| 7,268,774 B2 | 9/2007 | Pittel et al. |
| 7,280,851 B2 | 10/2007 | Oba et al. |
| 7,290,056 B1 | 10/2007 | McLaughlin, Jr. |
| 7,295,119 B2 | 11/2007 | Rappaport et al. |
| 7,295,960 B2 | 11/2007 | Rappaport et al. |
| 7,319,847 B2 | 1/2008 | Xanthos et al. |
| 7,333,785 B1 | 2/2008 | Lavelle et al. |
| 7,336,926 B2 | 2/2008 | Noda et al. |
| 7,343,174 B2 | 3/2008 | Suryanarayana et al. |
| 7,345,670 B2 | 3/2008 | Armstrong |
| 7,366,542 B2 | 4/2008 | Schmidt |
| 7,395,317 B2 | 7/2008 | Naick et al. |
| 7,412,518 B1 | 8/2008 | Duigou et al. |
| 7,415,711 B2 | 8/2008 | Chew et al. |
| 7,424,268 B2 | 9/2008 | Diener et al. |
| RE40,540 E | 10/2008 | Sainton et al. |
| 7,440,767 B2 | 10/2008 | Ballay et al. |
| 7,451,217 B2 | 11/2008 | Wardrop |
| 7,463,907 B2 | 12/2008 | Smith et al. |
| 7,474,296 B2 | 1/2009 | Obermeyer et al. |
| 7,483,964 B1 | 1/2009 | Jackson et al. |
| 7,500,917 B2 | 3/2009 | Barney et al. |
| 7,512,685 B2 | 3/2009 | Lunsford et al. |
| 7,516,201 B2 | 4/2009 | Kovacs et al. |
| 7,523,220 B2 | 4/2009 | Tan et al. |
| 7,526,539 B1 | 4/2009 | Hsu |
| 7,529,713 B1 | 5/2009 | Donner |
| 7,532,196 B2 | 5/2009 | Hinckley |
| 7,536,192 B2 | 5/2009 | O'Neill |
| 7,539,596 B2 | 5/2009 | Zoll et al. |
| 7,546,357 B2 | 6/2009 | Manchester et al. |
| 7,551,590 B2 | 6/2009 | Haller et al. |
| 7,602,756 B2 | 10/2009 | Gu et al. |
| 7,610,207 B2 | 10/2009 | Heins |
| 7,627,343 B2 | 12/2009 | Fadell et al. |
| 7,674,298 B1 * | 3/2010 | Cambridge ........ G08B 13/1409 726/35 |
| 7,685,288 B2 | 3/2010 | Kakivaya et al. |
| 7,716,273 B2 | 5/2010 | Soin et al. |
| 7,716,286 B2 | 5/2010 | Heins et al. |
| 7,734,293 B2 | 6/2010 | Zilliacus et al. |
| 7,756,474 B2 | 7/2010 | Watanabe et al. |
| 7,774,495 B2 | 8/2010 | Pabla et al. |
| 7,775,432 B2 | 8/2010 | Jalkanen et al. |
| 7,779,097 B2 | 8/2010 | Lamkin et al. |
| 7,792,968 B2 | 9/2010 | Datta et al. |
| 7,865,398 B2 | 1/2011 | Schon |
| 7,895,048 B2 | 2/2011 | Heins |
| 7,909,252 B2 | 3/2011 | Jalkanen et al. |
| 7,920,827 B2 | 4/2011 | Huomo et al. |
| 7,941,149 B2 | 5/2011 | Wang et al. |
| 7,949,784 B2 | 5/2011 | Van Datta |
| 8,023,940 B2 | 9/2011 | Lynch et al. |
| 8,023,953 B2 | 9/2011 | Zilliacus et al. |
| 8,023,991 B2 | 9/2011 | Backes et al. |
| 8,037,202 B2 | 10/2011 | Yeager et al. |
| 8,140,658 B1 | 3/2012 | Gelvin et al. |
| 8,210,433 B2 | 7/2012 | Jalkanen et al. |
| 8,250,624 B2 * | 8/2012 | Lamotte ............... H04L 63/164 726/1 |
| 8,308,065 B2 | 11/2012 | Jalkanen et al. |
| 8,366,000 B2 | 2/2013 | Jalkanen et al. |
| 8,639,819 B2 | 1/2014 | Pohja et al. |

(56) References Cited

U.S. PATENT DOCUMENTS

| | | | |
|---|---|---|---|
| 9,009,345 B1* | 4/2015 | Carbone | G06F 11/0709 709/236 |
| 9,396,469 B1* | 7/2016 | Takayama | G06Q 20/04 |
| 2001/0002912 A1* | 6/2001 | Tony | H04L 29/06 370/487 |
| 2001/0007815 A1 | 7/2001 | Philipsson | |
| 2002/0006793 A1 | 1/2002 | Kun-Szabo et al. | |
| 2002/0010603 A1* | 1/2002 | Doi | G06Q 10/02 705/5 |
| 2002/0012329 A1 | 1/2002 | Atkinson et al. | |
| 2002/0022961 A1 | 2/2002 | Sepanaho | |
| 2002/0065778 A1* | 5/2002 | Bouet | G06F 21/10 705/57 |
| 2002/0075844 A1 | 6/2002 | Hagen | |
| 2002/0076051 A1* | 6/2002 | Nii | G06F 21/10 380/232 |
| 2002/0083331 A1 | 6/2002 | Krumel | |
| 2002/0126013 A1* | 9/2002 | Bridgelall | G01S 5/0009 340/572.1 |
| 2002/0183038 A1 | 12/2002 | Comstock et al. | |
| 2002/0184385 A1 | 12/2002 | Kato | |
| 2002/0197956 A1 | 12/2002 | Annola | |
| 2003/0003868 A1* | 1/2003 | Juurikko | H04B 17/23 455/41.1 |
| 2003/0008647 A1* | 1/2003 | Takatori | H04M 1/725 455/420 |
| 2003/0033408 A1* | 2/2003 | Clough | H04L 29/06 709/225 |
| 2003/0063655 A1* | 4/2003 | Young | H04W 8/005 375/132 |
| 2003/0110216 A1* | 6/2003 | Althin | H04L 29/06 709/204 |
| 2003/0114104 A1* | 6/2003 | Want | H04W 4/023 455/39 |
| 2003/0162556 A1* | 8/2003 | Libes | H04W 76/14 455/507 |
| 2003/0231621 A1 | 12/2003 | Gubbi et al. | |
| 2004/0024884 A1* | 2/2004 | Rekimoto | G06F 1/1613 709/228 |
| 2004/0048570 A1* | 3/2004 | Oba | G06F 1/1626 455/41.1 |
| 2004/0053639 A1* | 3/2004 | Petite | G06Q 20/02 455/556.1 |
| 2004/0054604 A1* | 3/2004 | Frejlev | G06Q 30/02 705/26.1 |
| 2004/0077313 A1 | 4/2004 | Oba | |
| 2004/0110508 A1 | 6/2004 | Haartsen | |
| 2004/0114538 A1* | 6/2004 | Bouet | H04W 84/20 370/254 |
| 2004/0125092 A1 | 7/2004 | Kinerk et al. | |
| 2004/0128161 A1 | 7/2004 | Mazar et al. | |
| 2004/0148404 A1 | 7/2004 | Muroya et al. | |
| 2004/0172399 A1 | 9/2004 | Saffre | |
| 2004/0176065 A1* | 9/2004 | Liu | H04W 52/0254 455/343.1 |
| 2004/0203381 A1 | 10/2004 | Cahn et al. | |
| 2004/0203592 A1 | 10/2004 | Kermode et al. | |
| 2004/0204151 A1 | 10/2004 | Muthuswamy et al. | |
| 2004/0224602 A1 | 11/2004 | Kislevitz et al. | |
| 2004/0242216 A1 | 12/2004 | Boutsikakis | |
| 2004/0242250 A1 | 12/2004 | Sasai | |
| 2004/0268132 A1* | 12/2004 | Waris | H04L 63/0428 713/185 |
| 2005/0009469 A1* | 1/2005 | Kotola | H04W 12/06 455/41.2 |
| 2005/0015434 A1 | 1/2005 | He | |
| 2005/0015484 A1 | 1/2005 | Carter et al. | |
| 2005/0059420 A1 | 3/2005 | Salokannel et al. | |
| 2005/0071481 A1 | 3/2005 | Danieli | |
| 2005/0083181 A1 | 4/2005 | Jalkanen | |
| 2005/0093868 A1* | 5/2005 | Hinckley | G06F 3/011 345/502 |
| 2005/0120096 A1 | 6/2005 | Rekimoto | |
| 2005/0124293 A1* | 6/2005 | Alicherry | G01S 5/14 455/41.2 |
| 2005/0136834 A1 | 6/2005 | Bonta et al. | |
| 2005/0136903 A1 | 6/2005 | Kashima et al. | |
| 2005/0145688 A1 | 7/2005 | Milenkovic et al. | |
| 2005/0262241 A1 | 11/2005 | Gubbi et al. | |
| 2006/0106938 A1 | 5/2006 | Dini et al. | |
| 2006/0136546 A1* | 6/2006 | Trioano | G06Q 30/02 709/203 |
| 2008/0133716 A1 | 6/2008 | Rao et al. | |
| 2008/0207129 A1 | 8/2008 | Page et al. | |
| 2008/0320151 A1 | 12/2008 | McCanne et al. | |
| 2009/0182842 A1 | 7/2009 | Dutta et al. | |
| 2010/0153546 A1 | 6/2010 | Clubb et al. | |
| 2011/0219419 A1 | 9/2011 | Van Datta | |

FOREIGN PATENT DOCUMENTS

| | | |
|---|---|---|
| EP | 1330075 | 7/2003 |
| EP | 1414264 | 4/2004 |
| EP | 1437863 | 7/2004 |
| WO | WO0028403 | 5/2000 |
| WO | WO0145319 | 6/2001 |
| WO | WO03015451 | 2/2003 |
| WO | WO03034660 | 4/2003 |

* cited by examiner

AD-HOC CONNECTION BETWEEN ELECTRONIC DEVICES

This application is a continuation of U.S. application Ser. No. 14/098,807, filed Dec. 6, 2013, which is a continuation of U.S. application Ser. No. 10/773,765, filed Feb. 5, 2004, now U.S. Pat. No. 8,639,819, the entire contents of which are incorporated herein by reference.

FIELD OF THE INVENTION

The invention relates to a method of creating an ad-hoc connection between at least two electronic devices for enabling an interaction between the at least two electronic devices. The invention relates equally to a corresponding device and to a corresponding software program product.

BACKGROUND OF THE INVENTION

A mobile electronic device often travels along with its user from place to place. Each day, the user encounters dozens or even hundreds of other electronic devices having the potential to communicate with the mobile electronic device. The user meets for instance other people carrying their own mobile electronic devices, visits places equipped with consumer or office electronics, or passes by a store that provides electronic services or marketing.

There exist powerful user interface (UI) concepts which can be used in communications between different electronic devices, such as cut-and-paste, copy-and-paste and drag-and-drop concepts. These concepts provide very intuitive possibilities of interconnecting different applications even across different electronic devices. For instance, it is a simple task to drag-and-drop a file from the disk of one computer to the disk of another computer, provided that the computers are first connected to each other.

Before a user can make his or her mobile electronic device interact with an encountered electronic device, an ad-hoc connection has thus to be established first.

Most prior art approaches require the user to create an ad-hoc connection in a way that is specific to the connection technology. The creation of the ad-hoc connection may also be separated completely from the task for which the connection is desired.

For example, the user of a laptop computer may start a card manager application for activating a Wireless Local Area Network (WLAN) card and select the correct connection profile and/or access point. When making an ad-hoc connection, the user may even have to create a new connection profile. Finding the necessary parameters for the connection profile is a challenge of its own.

Unless the user encounters the same electronic device almost every day, it is therefore unlikely that the user bothers or is in a position to connect his or her mobile electronic device to some encountered device.

Also if the possibility of establishing a connection is integrated into an application, the user of known devices has to follow a complex menu structure until the right menu item is found. In general, it is a target to allow a desired item to be reached with as few clicks as possible, but due to the large amount of functions, there are usually nevertheless several clicks needed to reach a desired item.

In a typical situation in which content is to be shared or exchanged between the electronic devices of two users, somebody takes a picture with a DSC or a camera enabled mobile phone and desires to share the picture with another person close by. To send the item over a short-range technology, like Bluetooth™, the person has to select the right menu item in the device, address the other device, typically by first searching or inquiring the device, select the device and then transmit the picture file to the other device. This requires a couple of steps, and for many technically inexperienced end users, this will be a burden in actually using an available function.

SUMMARY OF THE INVENTION

It is an object of the invention to enable the creation of ad-hoc connections between electronic devices in a particularly user-friendly way.

A method of creating an ad-hoc connection between at least two electronic devices for enabling an interaction between the at least two electronic devices is proposed, which comprises at a first one of the electronic devices detecting a hugging state between the first electronic device and a second one of the electronic devices. A hugging state is assumed to be given if the first electronic device and the second electronic device are at least in close vicinity to each other and a piece of information is received at the first electronic device directly from the second electronic device. The proposed method further comprises, in case a hugging state is detected, obtaining a handle proceeding from the received piece of information. The handle comprises at least an address of at least one other of the at least two electronic devices than the first electronic device. Such another electronic device can thus be either the second electronic device or a further electronic device. The proposed method finally comprises establishing a communication channel between the first electronic device and the at least one other of the electronic devices using the address included in the handle.

Moreover, an electronic device is proposed, which comprises a touch detection portion and a link creation portion. The touch detection portion is adapted to detect a hugging state between the electronic device and a further electronic device. A hugging state is assumed to be given if the electronic device and the further electronic device are at least in close vicinity to each other and a piece of information is received by the electronic device directly from the further electronic device. The touch detection portion is further adapted to obtain a handle proceeding from a piece of information received from a further electronic device in case a hugging state is detected. The handle comprising at least an address belonging to at least one electronic device other than the proposed electronic device. The link creation portion is adapted to establish a communication channel to at least one other electronic device using an address included in a handle provided by the touch detection portion for enabling an interaction with the at least one other electronic device.

Moreover, an expandable framework for an electronic device is proposed, which comprises a touch detection portion, a link creation portion and an additional control portion. The touch detection portion and the link creation portion, which correspond to the touch detection portion and the link creation portion of the proposed electronic device, are connected to the additional control portion. The additional control portion is adapted to be supplemented by functional blocks supporting a respective service, and comprises at least one interface for enabling an input to functional blocks added to the additional control portion.

Finally, a software program product is proposed, in which a software code for creating an ad-hoc connection between at least two electronic devices for enabling an interaction between the at least two electronic devices is stored. The software code realizes the steps of the proposed method when running in a first one of the electrical devices.

The invention proceeds from the consideration that a user may physically indicate by touching, pointing, etc., that two devices should be connected to each other so that they can share information or otherwise interact. A piece of information transmitted during such an indication can then be employed by one of the devices for determining an address of the other device. Thereby, the device is able to automatically establish a communication channel to this address. The invention relies on a concept which is referred to as "hugging". The exact definition of this term and thus of the required criteria may vary. In the most general case, the "hugging" only needs to enable one electronic device to determine that another electronic device, which is currently nearby, might be willing to interact.

A subsequent interaction on an established communication channel is advantageously context dependent. An interaction is considered to be context dependent if the nature of the interaction depends on the state of either of the involved electronic devices, on a specific combination of their states and/or on an input to the electronic devices. The nature of the interaction between the electronic devices may also depend on the state of or the input to applications in the devices, on available data and services, on user preferences, etc. An interaction may be content dependent to the effect that it is selected in a context specific way which application within one electronic device is to interact with an application in another device. Similarly, if some additional information is passed to an application, the application is enabled to interact with another application via the communication channel in a context specific way. A context dependent interaction may be caused by any suitable component of the electronic device, for instance the link creation portion, the additional control portion of a provided framework, or an application.

Since it is proposed that an address is obtained as part of the handle for establishing a communication channel, the possible communication channels are not limited to direct links between the devices. Rather, any type of direct or indirect communication channel which allows reaching the address in the handle can be employed. That is, after the handle has been obtained, a large distance could be brought in between the involved electronic devices, as an indirect communication channel, for instance via some communication network, can be established. The communication channel uses advantageously, though not necessarily, a link between the involved electronic devices which enables an interaction via the communication channel over any distance, at least as soon as the involved electronic devices reach a distance to each other which does not permit another type of link for an interaction via the communication channel.

It is an advantage of the invention that it allows to unify the user experience of setting up a local or non-local ad-hoc connection across different technologies between electronic devices which are close to each other. If in wide use, the invention even allows unification of the user experience of setting up such a connection across all or almost all electronic devices that a person may own or use.

It is further an advantage of the invention that it reduces the amount of user time needed to set up such a connection. The invention makes setting up an ad-hoc connection and using it for a specific purpose a very intuitive, physical and easy experience, as it allows one to avoid having to type through a menu structure. Thus, it improves the usability of electronic devices.

In one embodiment of the invention, a hugging state is assumed to be given if the first and the second electronic devices actually touch each other physically. In order to enable a detection of such a touch, the electronic devices may be provided on their surface with a material ensuring a galvanic contact, for example a metal or a polymer that conducts electricity. A hugging state may also be seen in the act of connecting two devices, for example if a data cable is connected between a mobile phone and PC constituting the electronic devices, an Internet Protocol (IP) connection is opened, a VPN tunnel is set up and a http GET is done. For instance, a user could connect a desktop computer and a media phone with a data cable for one second and then leave the room taking the media phone along.

As an alternative to touching, a hugging state may also be assumed to be given for example if one electronic device, in particular a mobile device, is used for pointing at another electronic device. Such a pointing can be detected for instance by means of an infrared beam, a laser light or an infrasound, which all support passing information for a handle.

As a further alternative to touching, a hugging state may be assumed to be given if one electronic device is brought into close proximity of another device, for example to a distance of 5 to 50 centimeters. Detecting the proximity of another device can be based on the same technologies as detecting a pointing, if means for measuring the distance are added to the electronic devices. In addition, purely non-directional signals, such as those used in WLAN, Bluetooth™ or Radio Frequency Identification (RFID), can be used. At least Bluetooth™ enables a measurement of the distance. More specifically, the distance can be derived from Receive Signal Strength Indicator (RSSI) measurements.

The physical means required for detecting a hugging state thus depend on the respectively supported type or types of hugging which shall be detected. They may comprise a galvanic surface, an infrared (IR) led/detector, an RFID chip, a Bluetooth™ chip, etc. The physical means can be part of an electronic device itself or be built into an accessory, such as snap-on covers of a mobile phone. In addition, a logic can be used to determine that a hugging is taking place based on the information provided by the physical means.

Typically, the detection of a hugging state does not require user input beyond the actual causing of the hugging state, even though a user input is not excluded.

The handle which is obtained according to the invention can be or comprise, for instance, the IP-address or the Mobile Subscriber Integrated Services Digital Network (MSISDN) of the respective other electronic device.

Gaining the handle may simply comprise receiving such an IP-address or MSISDN of the other electronic device from the second electronic device, or it may involve complex negotiations between the first and the second electronic device for determining the address and possibly other communication parameters for setting up the connection.

In some cases, gaining the handle may require multiple steps, for example if RFID is used as technology for detecting a hugging and obtaining a handle.

RFID is a short-range technology which allows to write short data objects with a reader to a tag and to read short data objects with a reader from a tag. The distance between the reader and the tag has typically to be a few centimeters. A device can be provided with both, a reader and a tag. The tag can be passive and the tag content can have for instance a size of about 200 bytes.

For realizing the invention, the content of an RFID tag can be made use of in various ways.

In one alternative, the RFID tag is used in a conventional manner. That is, one device comprises an RFID tag storing a data packet, and an RFID reader in another device emits radio signals for causing an establishment of a connection. The RFID tag in the first device responds automatically with a stored data packet when both devices come close enough to each other.

In another alternative, a device may read the content of its own RFID tag and broadcast this content to its neighborhood. The broadcast may use, for example, Bluetooth™, WLAN, Ethernet or Infrared Data Association (IrDA) or a combination of thereof. Another device is then responsible of recognizing that it is being contacted and of measuring how close the device transmitting the content of its RFID tag is.

In both alternatives, the provided tag content could contain the final handle which is required for setting up a connection.

Usually, however, the content of an RFID tag by itself cannot provide sufficient data for creating a valid handle. First, the contents of the RFID tag have to reveal that it identifies an electronic device as opposed to, for example, a building or a room. Standardizing a specific RFID tag format for identifying devices according to the invention and for presenting their handles could permit this requirement to be met, but the resulting unit price for RFID tags might be prohibitive. Second, the address information required for the handle may change many times during the lifespan of an RFID tag. Updating the contents of the RFID tag would present another set of economic and technical challenges.

With some additional steps, however, RFID tags can be used in an easy way for detecting a hugging state and for allowing a handle to be obtained. The goal of those steps is to map the content of the tag, for example an ID, into a usable address such as an IP-address.

The provided tag content may contain, for example, at least enough information so that the other device can successfully respond, possibly with a broadcast of its own, thus opening a longer dialog for obtaining the handle.

In another embodiment, a received content of an RFID tag may cause a device to query a local database for known tag contents and their known mapping to usable addresses, for example IP-addresses. Instead of a local database, also a centralized database can be used. Such a centralized database has the advantage that it can serve a large number of devices and that it avoids the requirement that the devices have prior knowledge of each other.

As indicated further above, the handle may comprise in addition to an address any other information that can be used to establish a communication channel and, once it has been established, to use it. The handle can include for example a port number, security tokens, shared secret keys or public keys, information on which coding is to be used and information on when the established communication channel may be used. The handle may even include information originating from a third party, such as the price of using the communication channel. For example, for obtaining the handle, the connectivity provider could be queried for the price, once the involved electronic devices have agreed or tentatively agreed upon using a specific connectivity technology or a specific connection provider for the communication channel which is to be established.

A logic can be used for obtaining the necessary handle. The communication channel, which is set up according to the invention, may be based on any available communication technology and protocol, including for example Bluetooth™, WLAN, General Packet Radio Service (GPRS) and Universal Mobile Telecommunications Service (UMTS).

The selection of a specific communication channel among various available communication channels may be based on predetermined user preferences, in order to guarantee the best user experience. In some cases, it may also be advisable, though, to base the selection on a user input.

In one embodiment of the invention, care is taken that an established link is sustained under changing conditions. The link may be may be switched for example from IP-over-Bluetooth™ to GPRS, when two devices between which a Bluetooth™ connection had been established are no longer within the Bluetooth™ range.

Unless special care is taken, two devices in a hugging state may each create a link between each other. Typically, such a double linking is undesirable. In one embodiment of the invention, therefore a resolution mechanism is provided which determines which one of the devices is to create the communication channel. The resolution may, for instance, be carried out already when the handle is obtained. The result of the resolution may then be incorporated into the handle as information for a link creation portion of an electronic device. Alternatively, certain electronic devices might not be able to create the communication channel at all. Further alternatively, both electronic devices may create a communication channel and one of them is then dropped again. Further alternatively, some computational method is used for determining which one of the electronic devices shall create the communication channel. For example, the devices may compare their IP-addresses, and only the one with a "lower" or "higher" IP-address is responsible for creating the communication channel.

The created communication channel should be accessible to at least one application, should this at least one application desire to use it. The word application is to be understood in the widest possible sense including, for example, operating systems, utility software, end-user applications and dedicated hardware. The application could even be a piece of functionality offered by the operating system or some other application.

In some cases, it may be obvious, which application or applications are to be allowed to use an established communication channel, for example because there is only a single application on the device. Otherwise, an application selection logic may be employed for selecting which application or applications are to use an established communication channel.

In one embodiment of the invention, the respective application is selected which is currently receiving the user input. Most known operating system support this approach. They identify an application currently receiving the user input under different names, like "foreground application", "active application", "application with focus", etc.

Another way of selecting an application may be based on determining what kind of applications or data are supported by the respective other device.

The applications may be required for instance to register to some functional block of the device in order to utilize an established communication channel. All applications in the device may then register themselves along with information about what kind of services or data they can produce, consume or otherwise share. Based on this information, an application can then be selected to be allowed to use an established communication channel. For instance, during a hugging state, the selection logic in two devices between which a communication channel is established may determine which registered application has a counterpart application in the respective other device that is capable of sharing the indicated type of information.

In one embodiment of the invention, an electronic device could also launch, that is, invoke an application or some function of an already-running application, which is allowed to make use of a communication channel. For example, an application or a certain function of an application may be triggered based on the contextuality of the currently selected user menu. That is, an application can be started automatically based on the context of the current menu item, once a communication channel has been established.

When invoking an application or some function, additional data may be provided which is to be used by the invoked application or function, for instance information on whether the antenna of the electronic device is pointing upwards or downwards.

In the proposed framework, a logic forming part of the additional control portion could control and execute the invoked application or function of at least one desired application or function. A very simple logic could be used for simply launching a selected application, while a slightly more complex logic could first check whether the selected application is already running and launch it only in case it is not running. An even more complex logic could be involved in passing context-specific parameters to the application after it has been made sure that it is already running.

Alternatively, a special invoking application similar to Corba could be employed for taking care that a selected application or function is invoked when necessary. The invoking application may then receive some context-specific data and identify based on at least part of this data other applications or functions which are allowed to use an established communication channel. The invoking application then invokes the identified applications or functions if necessary and passes the rest of the context-specific data, if any, to them. A logic would then only be required for selecting the applications and functions and for providing the context-specific data to the invoking application. Such a logic could also form part of the additional control portion of the proposed framework.

An application which is allowed to use an established communication channel has to become aware when the communication channel is available for use or when it is requested by an application in another device to share data. This awareness can be achieved by a polling by the application, by notifications to the application, by callbacks to the application, by broadcast to the application, etc.

If the application itself does not poll for an established communication channel and/or for a request to share data, for example a link creation portion of a device may be responsible for informing the application about a new communication channel and about possible changes in the status of the communication channel. Alternatively, an application selection logic may be responsible for informing a selected application about an established communication channel and/or a request to share information.

In one embodiment of the invention, an application is notified about an established communication channel after a communication channel has been established. In a more complex embodiment, an application is first notified that a communication channel is to be established, and the actual creation of the communication channel is postponed until a notified application indicates that it is ready to use the communication channel.

Once a communication channel has been established between at least two devices and applications in these at least two devices are aware of the established communication channel, these applications may communicate and interact in an application specific way across the communication channel.

Pieces of functionality offered by the operating system or some other application which may be considered as an application are for example the well known cut-and-paste, drag-and-drop and copy-paste mechanisms, etc.

Existing operating systems and applications implement cut-and-paste, drag-and-drop mechanisms and the like in different ways. In one embodiment of the invention, the implementation is adapted to support a use of these mechanisms as an application which may use a communication channel established in accordance with the invention. If a user starts a cut-and-paste, copy-paste or drag-and-drop operation on one device by using a user interface of one of these mechanisms, the user indicates thereby in such an adapted implementation that the mechanism is the application which is to be selected. If the user then hugs the device with another, or vice versa, the user may complete the operation on the other device, once the communication channel has been established.

In one embodiment of the invention, also the applications may influence the content of the handle, for instance by interacting with the portion of the device detecting a hugging state. If this kind of implementation is used, the handle may also contain information which is only relevant to the involved applications in both devices. This part of the handle is also referred to as secondary handle. The handle may then comprise for instance an IP-address enabling the creation of a communication channel and in addition a secondary handle relating to an Moving Picture Experts Group (MPEG) 4 stream and intended for an application supporting MPEG-4 streams.

In another embodiment of the invention, a secondary handle is exchanged between devices via the established communication channel, and thus separately from the original handle containing the address information.

The electronic devices according to the invention can make use of sensors not only for the actual detection of a hugging state, but also in various ways for influencing the employment of the established communication channel.

In one embodiment of the invention, for example, sensors are provided which detect whether the antenna of a mobile phone constituting one of the electronic devices points upwards or downwards. Such a sensor and an associated logic allows the user of the mobile phone to indicate the direction of a desired data transfer via a communication channel by tilting the antenna of a mobile phone upwards or downwards. Antenna up could mean that data is to be uploaded to the mobile phone and antenna down could mean that data is to be downloaded from the mobile phone, or vice versa.

Instead of tilting, obviously any other physical manipulation of an electronic device could be detected by appropriate sensors, such as squeezing, shaking or rotating the electronic device, establishing an absolute rotational position of the electronic device or a rotational position relative to another device, moving the electronic device with a certain absolute or relative speed, moving the electronic device with a certain acceleration, etc. Any of these movements can then be evaluated by a logic in order to determine for instance a desired direction of a data transfer or the behavior of the involved applications etc.

If some information is passed to an application, like information on the direction in which the antenna of the device is pointing, this information may thus form as well the basis for a context dependent interaction or, at least, enable the application to behave in context specific way.

In an advantageous embodiment of a device according to the invention, the device comprises an expandable framework. The framework comprises the basic features of the device, including a touch detection portion and a link creation portion. In addition, various functional blocks can be added to the framework. Each functional block provides the logic for an additional service to the applications in the device, to applications in other devices or to the portions of other devices realizing the detection of a hugging state, the obtaining of a handle and/or the creation of a communication channel.

One possible additional functional block may provide a logic for realizing the above mentioned application selection. Another possible additional functional block may provide a logic for determining the direction of a data exchange in cases where the roles of the applications in the two devices has to be determined. Yet another possible additional functional block may provide a logic for determining the most suitable data format when sharing data via an established communication channel. Yet another possible additional functional block may provide a logic for an authentication, an authorization and/or an audit/accounting functionality, or other security services.

The possible context specificity of the invention might also focus on the interface between applications of an electronic device and components of this electronic device realizing the invention, for example components of the proposed framework. If the data passing through this interface, for instance information on the direction in which the antenna of the device is pointing, or data on the behavior of the interface, for instance information about which application gets selected, varies depending on a state information or on an available input, the interaction is, or has the capability of being, context dependent.

A communication channel established in accordance with the invention can be released again in various ways.

In one embodiment of the invention, an application is able to allow or to force the communication channel to be closed.

Alternatively or in addition, the component of the device which is responsible for creating the communication channel may also be responsible for terminating the communication channel again based on some suitable logic. A communication channel could be terminated for example after a predetermined period of non-use of the established communication channel.

Alternatively or in addition, an established communication channel may be terminated when a hugging state is detected for a second time after a communication channel has been established. The second hugging between devices is detected in the same way as the first one, but triggers the termination of the communication channel. In the simplest implementation of this embodiment, the existence of a link between two devices determines whether a detected hugging state results in the establishment of a communication channel or in the termination of an existing communication channel.

Alternatively or in addition, the detection of a second hugging can also be combined advantageously with the above described embodiment for pieces of functionality like cut-and-paste. The detection of a second hugging allows the necessity for a repeated entry of the hugging state to be avoided when a series of copy or move operations is to be carried out. Instead, a first hugging is achieved as a part of the first operation, and all subsequent operations are based on the communication channel and the parameters of that hugging. During or after the last operation, a second hugging terminates the sequence and, if desired, the communication channel.

The use of a second hugging for terminating a communication channel, however, is limited to cases where the user remains near the other device for the duration of the connection or, at least, returns to the other device when it is time to terminate the connection.

The invention can also be employed for linking up several devices, for example in a row in some kind of a temporal daisy-chain.

In one embodiment of the invention more than two devices may even be allowed to enter a hugging state with a certain device at the same time. One device may for example multicast or broadcast its desire to enter a hugging state to a number of devices, for instance via IrDA or Bluetooth™.

The possibility of linking of several devices could also be implemented using application specific functional blocks. But since such a linking may be useful for various applications, it is well suited as a functional block of the above mentioned framework.

In a further embodiment of the invention involving several devices, one mobile device may be used for causing the establishment of a communication channel between two other devices, in particular two non-mobile electronic devices, by hugging both one after the other.

A user interface may be provided which enables a user to influence all or selected ones of the described functions. Some selected embodiments of the invention are summarized in the following.

In a "Basic Touch-and-Share" embodiment, the user of a mobile device touches some other electronic device with the mobile device. The user finds that one or more applications start to interact in an application specific way.

In a "Cut-Touch-Paste" embodiment, the user starts a cut-and-paste, copy-paste or drag-and-drop operation on one electronic device, touches one device with the other, and completes the operation on the other device.

In a "Touch only" embodiment, the user of a mobile device touches some other device with the mobile device. The user finds that the two devices are now connected, for instance that they have an IP-connectivity.

In a "Touch and toggle" embodiment, the "Touch only" embodiment is supplemented in that the established connection is disrupted when the involved electronic devices touch for a second time.

In "Variations of Touch" embodiments, a mobile device is used for pointing at another device or other devices instead of touching them. Alternatively, the mobile device is taken in close proximity of the other device or devices.

An important part of the Touch-and-Share concept is that while the Touch part is momentary, the Share part may continue for a long time. In the mentioned "Basic Touch-and-Share" embodiment, for example, touching a desktop computer with a media phone may result in dozens of megabytes of a picture file being uploaded from the mobile phone to the computer over a relatively slow link, like GPRS.

It is understood that any of the described embodiments of the invention can be combined and varied in may ways.

Further, any employed logic can be realized either in hardware or in software.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
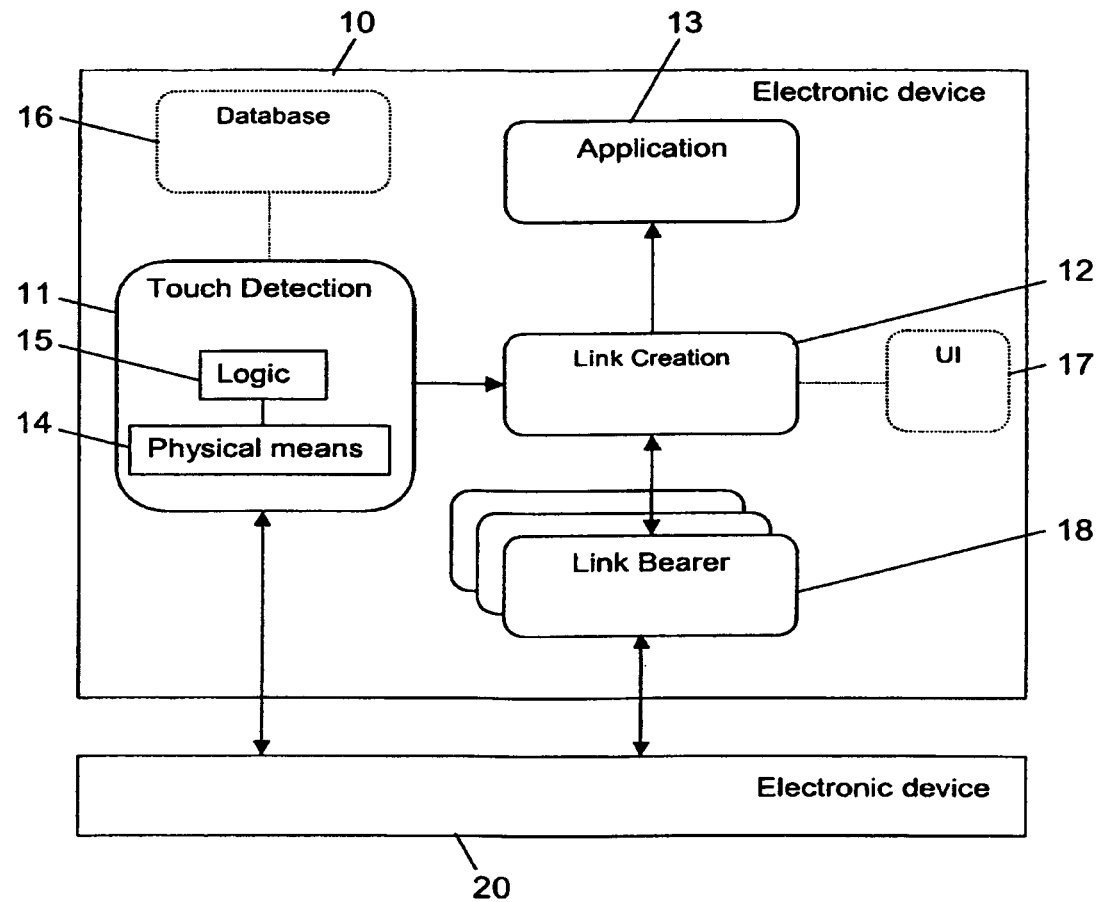
FIG. 1 schematically shows a block diagram of a minimal implementation of the invention.

FIG. 1 schematically presents a block diagram with two electronic devices 10, 20, which are enabled to create a hugging-based ad-hoc connection between each other in accordance with a first embodiment of the invention. At least one of the electronic devices is a mobile device.

The first electronic device 10 comprises a touch detection portion 11, a link creation portion 12 and at least one application 13. The touch detection portion 11 further comprises physical means 14 for realizing the hugging and a logic 15. The touch detection portion 11 may further have access to a local database 16, as indicated in FIG. 1 by dotted lines. The database 16 maps known RFIDs to usable IP addresses. Moreover, a user interface 17 may be connected to the link creation portion 12, which is equally indicted by dotted lines. In the current embodiment, the physical means 14 for hugging include by way of example by an RFID chip, which is integrated into the electronic device 10. The link creation portion 12 has access to several link bearers 18.

For the second electronic device 20, no details are shown. It may comprise the same components as the first electronic device 10, but some functional components or parts thereof may also be missing. It may have, for example, no link creation portion, as long as it is able to use a link created by the link creation portion 12 of the first device 10. If IP addresses are used for creating the ad-hoc connection, for instance, the second device 20 could have only the usual IP stack without any additional functionality besides a touch detection portion.

Figure 2:
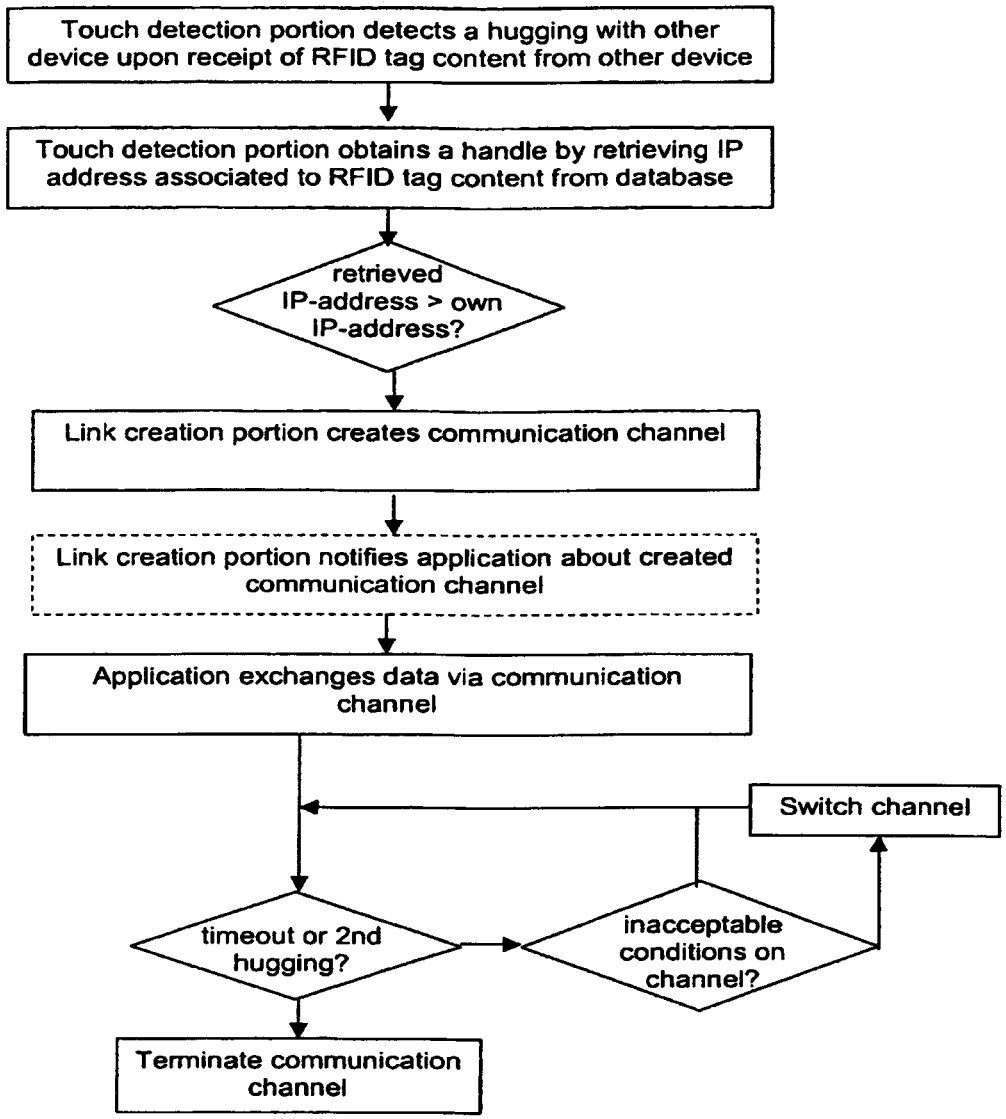
FIG. 2 is a flow chart illustrating an operation in the embodiment of FIG. 1.

The creation of an ad-hoc connection between the first electronic device 10 and the second electronic device 20 of FIG. 1 will now be described with reference to the flow chart of FIG. 2.

In a first step, the touch detection portion 11 detects that it hugs another device 20 or that it is being hugged by another device 20. That is, the physical means 14 for hugging forward or forwards measurement results and/or received data to the logic 15 of the touch detection portion 11. The logic 15 then determines based on the received information whether a hug is occurring.

If the electronic devices 10, 20 comprise respective RFID chips 14, the hugging detection may include detecting at one device a transmitted content of an RFID tag, measuring how close the device transmitting the tag content is, and determining based on this information whether a hugging is taking place. For example, when the second device 20 broadcasts the content of its RFID tag to its neighborhood over Bluetooth™, WLAN, Ethernet or IrDA, etc., or over a combination thereof, the RFID chip 14 of the first device 10 may detect this content. The logic 15 of the first device 10 determines based on the signal strength of the received tag content whether the transmitter of the tag content can be assumed to be close and thus to be hugging the first electronic device 10.

In a further step, the logic 15 of the touch detection portion 11 obtains a handle comprising address information which can be used to address the second electronic device 20. The address information is assumed by way of example to be an IP-address.

If a hugging is determined by way of an RFID tag, the logic 15 of the touch detection portion 11 may be caused to query the local database 16 for known tag contents and their mapping to usable IP addresses. An IP address associated in the database 16 to the received tag content is then used as a handle.

The touch detection portion 11 of the first electronic device 10 will typically not require a user input, except possibly for the actual hugging by putting the first electronic device 10 into a relation to the second electronic device 20 which is predetermined for a hugging.

The hugging state has only to be maintained until the required handle information, in the present case the RFID tag content, has been transmitted by the second electronic device 20 to the first electronic device 10.

Instead of an RFID chip, the physical means of both electronic devices 10, 20 could comprise be for example a material on the surface on both electronic devices enabling a galvanic contact. If both devices touch physically, the galvanic connection is detected and an IP-address of the second electronic device 20 can be transmitted via this galvanic connection to the first electronic device for use as a handle.

In a subsequent step, the obtained handle is forwarded by the touch detection portion 11 to the link creation portion 12, and the link creation portion 12 creates a link between the first electronic device 10 and the second electronic device 20.

If the handle is or comprises an IP address, as in the current example, the link creation portion 12 can use any available link bearer 18, that is, any available communication channel which ensures that the indicated IP address can be reached. The available link bearers 18 may comprise for instance GPRS, dial-up modem, data cable connected to a desktop computer with Ethernet card, etc.

Typically, the link creation portion 12 does not require any input of the user either. In some cases, it may be advisable to allow an access by a user via a user interface 17, for example for determining which one of the available link bearers 18 should be used. For the best user experience, though, the link bearer 18 should be selected based on predetermined user preferences.

If the second electronic device 20 comprises as well a link creation portion, it is advantageously avoided that the link creation portions of both devices 10, 20 create a communication channel between the two devices 10, 20. By way of example, each electronic device obtaining a handle compares therefore for example an included IP-address with its own IP-address, and only if the included IP-address is lower than its own IP-address, the respective device is responsible for creating the link. This step is indicated by a decision step in FIG. 2.

To be useful, the communication channel created by the link creation portion 12 must be accessible in some way to the at least one application 13, should this application desire to use the communication channel.

The link creation portion 12 may or may not be aware which applications 13 exist or are running, and it may or may not be responsible for informing the applications 13 about a new link and about possible changes in the status of the link. In FIG. 2, a further step, in which the link creation portion 12 notifies an application 13 of the first electronic device 10 that a communication channel has been established, is therefore indicated by dotted lines. Alternatively, the at least one application 13 could poll, for example, itself for an established communication channel.

Then, the application or applications of the electronic devices 10, 20 may use the communication channel whenever needed. One application 13 may be for example a piece of functionality offering Cut-and-Paste or Drag-and-Drop operations. Such an application may be part of a more extensive application, in particular of an operating system. The implementation of this piece of functionality may be based on known implementations which are adapted to the invention. A user may select for instance an item for a Cut-and-Paste or Drag-and-Drop operation. As soon as the piece of functionality 13 implementing the Cut-and-Paste or Drag-and-Drop function is notified that a communication channel has been established, the piece of functionality 13 will transmit the selected item via the communication channel to the second electronic device 20.

The link creation portion 12 may monitor as well, whether the established communication channel should be terminated. In case of a timeout indicating that the communication channel has not been used for a predetermined period of time, the communication channel is disconnected.

In a "Touch and Toggle" implementation, the link creation portion 12 may monitor in addition whether the detection of a second hugging is reported by the touch detection portion 11 while a communication channel exists. If such a second hugging is reported, the communication channel is equally disconnected.

The link creation portion 12 further monitors whether the conditions on the established communication channel deteriorate. In case the conditions become unacceptable, the link creation portion 12 switches the link to another communication channel, if possible. The link creation portion 12 may switch for example from an IP-over-Bluetooth™ connection to a GPRS connection, when the two electronic devices 10, 20 are no longer within the Bluetooth™ range to each other.

The embodiment of the invention described with reference to FIGS. 1 and 2 may be employed in various situations, a few of which will be presented in the following.

In one possible situation, the first electronic device 10 could be for example a TV-set and the second electronic device 20 a mobile phone. A user may be watching a TV program on the TV-set, but has to leave home before it is finished. Before leaving, the user simply hugs the TV-set with a mobile phone he will carry along. The TV-set detects the hugging, obtains a handle including the IP-address of the mobile phone, establishes a communication channel to the mobile phone, goes to stand-by and transmits the selected TV program via the established communication channel to the mobile phone. The user may then continue watching the same TV program on the display of the mobile phone.

In another possible situation, the first electronic device 10 is a desktop computer and the second electronic device 20 is a laptop. An office worker has opened the disk management application of her desktop computer and selected a disk to share. Then, she causes a hugging state between the computer and the laptop. The computer detects the hugging state, obtains a handle including the IP-address of the laptop and establishes a communication channel to the laptop. The laptop may then mount the disk via the established communication channel.

In another possible situation, the first electronic device 10 is a desktop computer and the second electronic device 20 is a mobile phone. A businessman may be in a rush to go to an airport and would like to download some large files from his desktop computer to his mobile phone, which has a very slow connection. He opens a file management application on the computer, selects the desired files and clicks on an option which may be named "Send to Touch-and-Share". He then hugs the computer with his mobile phone and rushes to his car. During the short hugging, the computer received from the mobile phone information for obtaining the IP-address of the mobile phone. Thereupon, the computer establishes a GPRS connection to the mobile phone, and an application starts to download the selected files to the mobile phone via the established connection. By the time the businessman reaches the airport, the files have been downloaded to the mobile phone.

The distinction between the touch detection portion and the link creation portion is that the touch detection portion can rely on having a communications channel open between the two devices for the duration of creating the handle, while the link creation portion may not have such a channel available until the desired communication channel itself is created. This distinction is, however, not always completely obvious. For example, the physical communications channel used during a hugging may remain available even after the hugging state has been terminated. A hugging of two devices can be given if two devices are very close to each other, which can be detected for instance based on the timing or on the strength of radio signals received from the respective other device via a radio interface, but the devices may also be capable of communicating at a greater distance using the same radio interface. Also when RFID tags are used for detecting a hugging state, the distinction may not be obvious.

Figure 3:
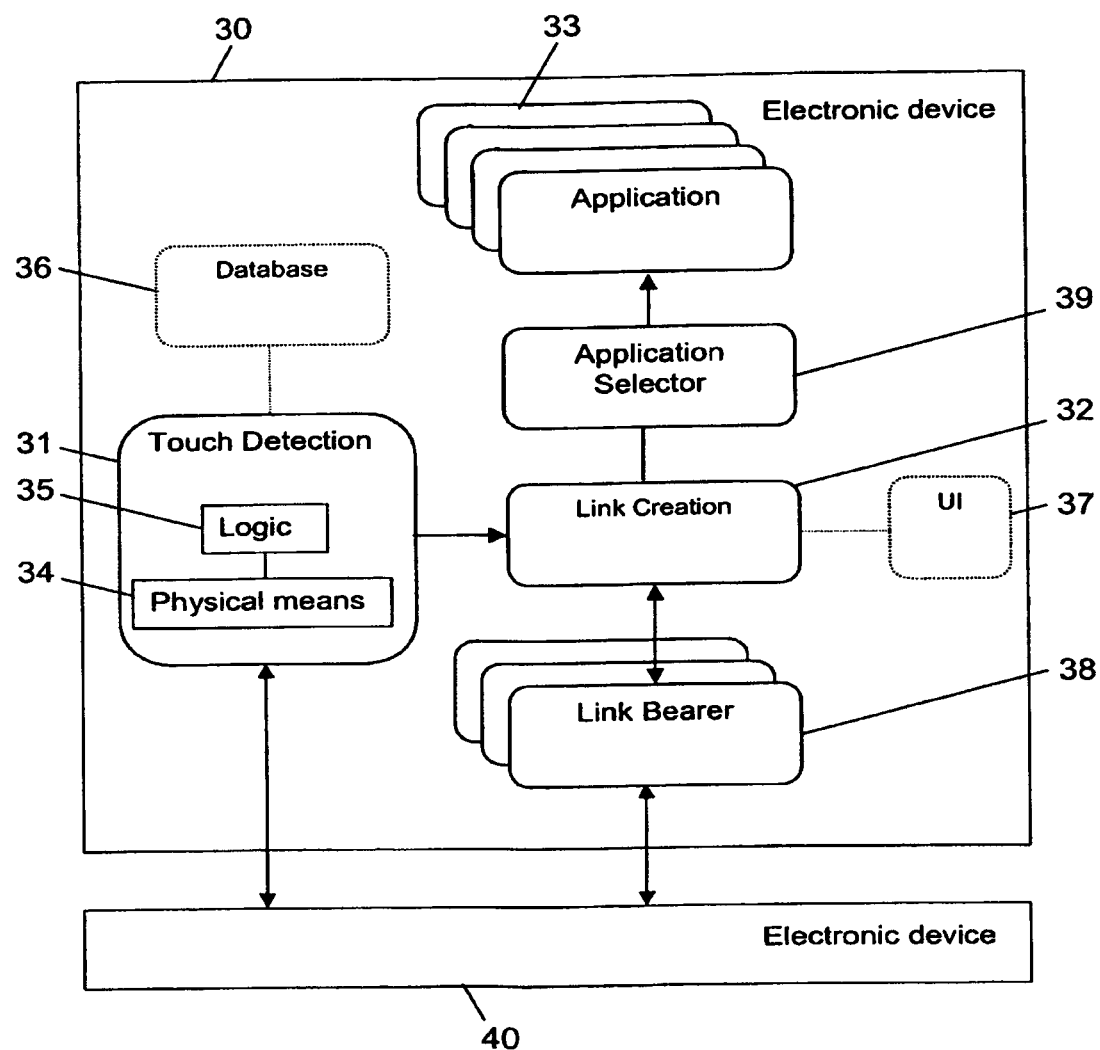
FIG. 3 schematically shows a block diagram of an extended implementation of the invention.

FIG. 3 schematically presents a block diagram with two electronic devices 30, 40, which are enabled to create a hugging-based ad-hoc connection between each other in accordance with a second embodiment of the invention. At least one of the electronic devices is a mobile device.

The first electronic device 30 comprises components 31 to 38 which correspond to the components 11 to 18 of the first electronic device 10 of FIG. 1. In addition, however, it comprises an application selector 39 arranged between the link creation portion 32 and a plurality of applications 33.

For the second electronic device 40, no details are shown. It is assumed to comprises the same components as the first electronic device 30, even though some components could be missing.

Figure 4:
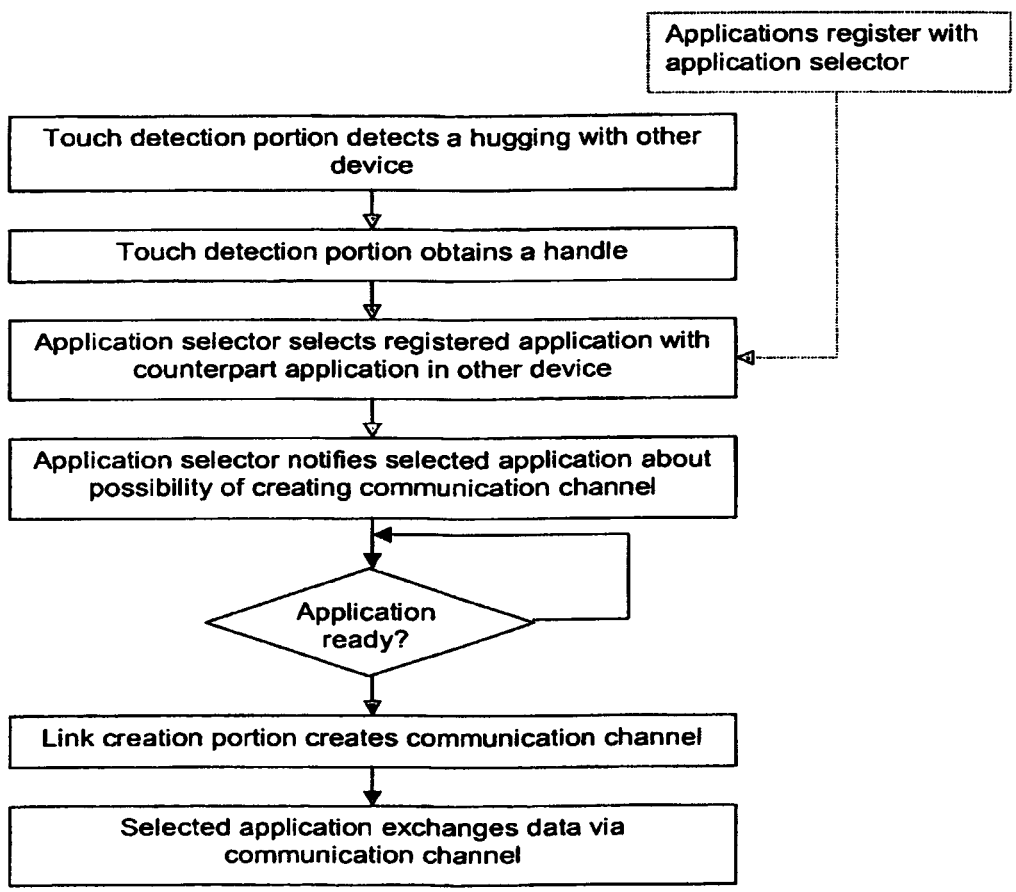
FIG. 4 is a flow chart illustrating an operation in the embodiment of FIG. 3.

The creation of an ad-hoc connection between the first electronic device 30 and the second electronic device 40 of FIG. 3 will now be described with reference to the flow chart of FIG. 4.

The creation of the ad-hoc connection is basically the same as described with reference to FIG. 2. Since the application 33 which is allowed to use the created communication channel may not be obvious, however, the application selector 39 selects one or more applications 33 which are allowed to use an established communication channel. The application selector 39 includes to this end a selection logic.

By way of example, it is assumed that any application 33 has to register itself with the application selector portion 39 or some other component in order to utilize the "Touch-and-Share" functionality. An application 33 registers itself along with information about what kind of services or data it can produce, consume or otherwise share. For example, one application may be able to receive an MPEG-4 stream and another application may support a protocol interface recognizable by its Web Services Description Language (WSDL) URL.

Next, a hugging is detected and a handle obtained by the touch detection component 31 of the first electronic device 30 as described with reference to FIGS. 1 and 2.

In addition, the application selector 39 in both devices 30, 40 evaluate during the hugging state whether the devices 30, 40 have counterpart applications capable of producing and willing to share data with an application in the respective other device. For instance, the application selector portion 39 in both devices 30, 40 may decide that an application supporting MPEG-4 in one device 30 has a counterpart application in the other device 40 which is able and willing to share an MPEG-4 stream. Thus, these applications are selected by the application selector portion 39 in both devices 30, 40.

Further, the application selector 39 in the respective device 30, 40 informs the selected applications 33 that a communication channel will be created. The handle obtained by the touch detection portion 31 of the first electronic device 30 may comprise in addition to the address information required for a later link creation as well a secondary handle for the selected application, for instance for the MPEG-4 stream, which may be used exclusively by the selected application. In this case, the application selector 39 forwards the secondary handle to the selected applications 33 when informing these applications 33 that a communication channel will be created.

Then, the application selector 39 in the first electronic device 30 monitors whether it receives an indication by the selected applications 33 of the first electronic device 30 that they are ready to use the offered communication channel. Upon such an indication, the application selector 39 causes the link creation portion 32 to create a communication channel to the second electronic device 40 based on the address in the obtained handle.

The further operation may be similar as the operation in the first embodiment described with reference to FIG. 2.

Alternatively or in addition, the application selector 39 could select the application 33 which is currently receiving a user input, if the operating system of the electronic device 30 supports this approach by registering this application as "foreground application", "active application", "application with focus", or the like.

The actual interaction on an established communication channel is context specific. For example, a user of a first mobile phone may want to share ten large files with the user of a second mobile phone. The user of the first mobile phone marks the files on her mobile phone for copy-and-paste and defines thereby a context. The user of the first mobile phone then touches the second mobile phone with her mobile phone. The touch should require less than one second. By the touch, a context specific share is triggered. The share may happen independently of location, time limitations and user input based on user preferences. The user of the second mobile phone rushes to the airport, while the files are downloaded to his mobile phone.

The embodiment of the invention described with reference to FIG. 3 may also be employed in scenarios involving multiple devices.

In one exemplary scenario, the electronic devices are gaming devices which are employed for a mobile multi-player game exhibiting a linking of multiple gaming devices. In a certain situation, a group of persons is playing the mobile game over Bluetooth™. A further person joins the group and hugs the gaming device of one of the players with his own gaming device. In the gaming device of the player, the touch detection portion 31 detects a hugging state and obtains a handle, the link creation portion creates a communication channel, and the application selector 39 notifies the active application 33. Using the created communication channel, the same game is invoked thereupon by the notified application in the device of the further person via the established communication channel. The game may even be downloaded to his device, if necessary.

Figure 5:
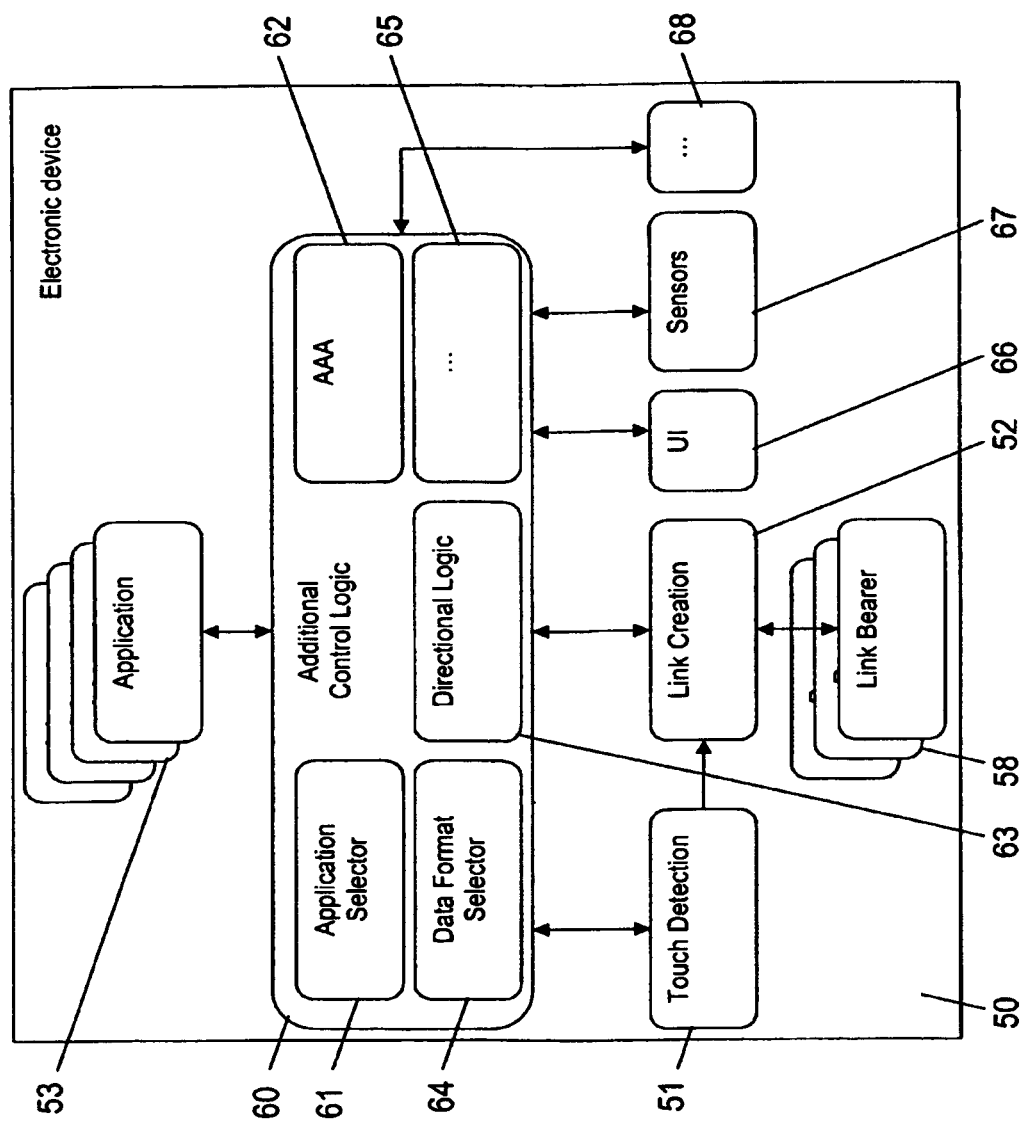
FIG. 5 schematically shows a block diagram of an expandable implementation of the invention.

FIG. 5 schematically presents an electronic device, which is enabled to create a hugging-based ad-hoc connection with another electronic device in accordance with a third embodiment of the invention.

The electronic device 50 comprises in contrast to the embodiments of FIGS. 1 and 3 an extendable framework with partly variable functional blocks.

The framework comprises like the electronic devices of FIGS. 1 and 3 a touch detection portion 51, a link creation portion 52 with access to link bearers 58 and applications 53. In addition, however, it comprises an additional control logic portion 60 which is responsible for enforcing the logic needed to provide additional services which a particular implementation of the electronic device 50 may provide to the applications 53 in the device 50 or in other devices, or to the implementation in general of other devices.

The touch detection portion 51, the link creation portion 52 and the applications 53 have access to the additional control logic portion 60. In addition, a user interface UI 66 and sensors 67 are connected to the additional control logic portion 60. Further components 68 may equally connected to the additional control logic portion 60.

For providing the desired services, the additional control logic portion 60 itself may include various functional blocks. Several exemplary blocks are indicated in FIG. 5.

The exemplary functional blocks include an application selector 61, which can have similar functions as the application selector 39 of the first electronic device 30 of FIG. 3. The application selector 61 might also be split further into two functional blocks. One block could then be responsible for selecting the application 53 that is allowed to use an established communication channel, while the other block could be responsible for producing an application specific secondary handle. Such a split-up enables a better modularity and a better integration with a Drag-and-Drop functionality, a Copy-Paste functionality, etc.

The exemplary functional blocks of the additional control logic portion 60 further include an AAA block 62, which provides an authentication, authorization and audit/accounting functionality along with other security services that may be needed by in a "Touch-and-Share" operation or by some of the applications 53, unless such a functionality is implemented in these applications themselves. If the electronic device 50 belongs to a service provider, for example, the AAA block 62 might determine based on the IP address of a handle obtained during a hugging state with some other electronic device, whether this device is authorized to access a certain service and which charging rates are to be applied. For the authentication etc., also additional information might be exchanged during the hugging state between the AAA block 62 and the other electronic device via the touch detection portion 51.

The exemplary functional blocks of the additional control logic portion 60 further include a directional logic 63. This directional logic 63 provides a logic for determining the direction of share via the communication channel in those cases, in which the roles of involved applications in two devices has to be determined. For example, if an FM-radio-equipped device touches an FM radio, it has to be determined which one gets tuned to the frequency of the other. The respective choice of a direction by the directional logic 63 could be based on user preferences, device preferences, randomness, a user input via the user interface 66 or measurement data provided by the sensors 67, etc. In absence of a directional logic 63, a similar functionality may have to be implemented on an application basis.

The exemplary functional blocks of the additional control logic portion 60 further include a data format selector 64, which provides a logic which enables the applications 53 to find the most suitable data format when sharing data via an established communication channel. The functionality of this block can be realized similarly as the "Paste Special . . . " functionality in some office applications.

Any other functional block 65 realizing a desired function can be integrated as well in the additional control logic portion 60.

The user interface 66 can be used by any of the functional blocks 61 to 65 in the additional control logic portion 60, in order to involve the user in the logic or functioning of the respective block. The user interface 66 can equally be used by the Touch Detection portion 51 and/or the Link Creation portion 52 if desired.

Moreover, sensors 67 may be used for supporting various functions.

Figure 6:
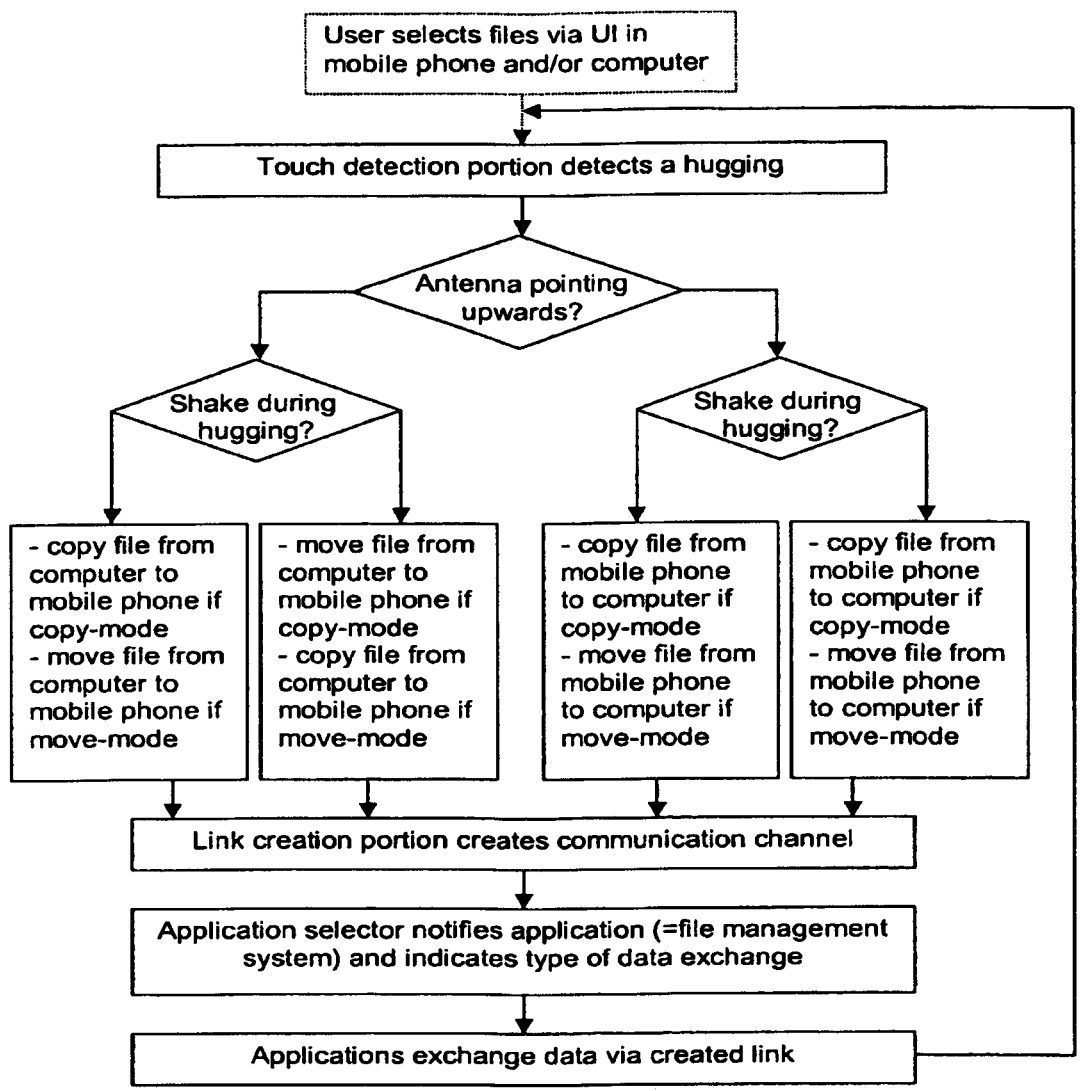
FIG. 6 is a flow chart illustrating an operation in the embodiment of FIG. 5.

One implementation of the electronic device 50 uses the sensors 67 in combination with the directional logic 63 in the electronic device 50 for influencing the sharing behavior, as illustrated in the flow chart of FIG. 6. The embodiment is used for "pouring" data from one electronic device to another.

One electronic device is assumed to be a mobile phone and the other one a computer. Both may be implemented as described with reference to FIG. 5. The active application in both devices presents a view of a file folder.

In a first step, a user selects via a user interface a number of files on one or on both devices. The selection can be performed for example by highlighting the files.

Then, at least the touch detection component 51 of the mobile phone detect a hugging with the computer, as described above.

During the hugging, the sensors 67 of the mobile phone determine whether the antenna of the mobile phone is pointing upwards or downwards and forward this information to the directional logic 63 of the mobile phone.

The sensors 67 of the mobile phone determine in addition whether the mobile phone is shaken during the hugging and forward this information as well to the directional logic 63 of the mobile phone.

If it is detected that the antenna of the mobile phone is pointing upwards and that the mobile phone is not shaken during the touch, it is determined by the directional logic 63 of the mobile phone that the user desires to copy the selected files from the computer to the mobile phone, if a copy-mode is active. If a move-mode is active, the directional logic 63 of the mobile phone determines that the user desires to move the selected files from the computer to the mobile phone.

If it is detected that the antenna of the mobile phone is pointing upwards and that the mobile phone is shaken during the touch, it is determined by the directional logic 63 of the mobile phone that the user desires to move the selected files from the computer to the mobile phone, if a copy-mode is active. The directional logic 63 switches to a move-mode. If a move-mode is active, the directional logic 63 of the mobile phone determines that the user desires to copy the selected files from the computer to the mobile phone. The directional logic 63 switches to a copy-mode.

If it is detected that the antenna of the mobile phone is pointing downwards and that the mobile phone is not shaken during the touch, it is determined by the directional logic 63 of the mobile phone that the user desires to copy the selected files from the mobile phone to the computer, if a copy-mode is active. If a move-mode is active, the directional logic 63 of the mobile phone determines that the user desires to move the selected files from the mobile phone to the computer.

If it is detected that the antenna of the mobile phone is pointing downwards and that the mobile phone is shaken during the touch, it is determined by the directional logic 63 of the mobile phone that the user desires to move the selected files from the mobile phone to the computer, if a copy-mode is active, thereby entering a move-mode. The directional logic 63 switches to a move-mode. If a move-mode is active, the directional logic 63 of the mobile phone determines that the user desires to copy the selected files from the mobile phone to the computer. The directional logic switches to a copy-mode.

Then, the link creation portion 52 of one of the devices creates a communication channel as described above. Further, the application selectors 61 of both devices notify the file management system within the operating system of each device as relevant applications that a link has been created and about the desired kind of data exchange.

The file management systems exchange thereupon data via the respective application selector 61, the respective link creation portion 52 and the link bearer 58 used for the created communication channel as requested.

If a further hugging is performed, the copy-mode can be transformed into a move-mode and vice versa by shaking the mobile phone during the hugging.

Figure 7:
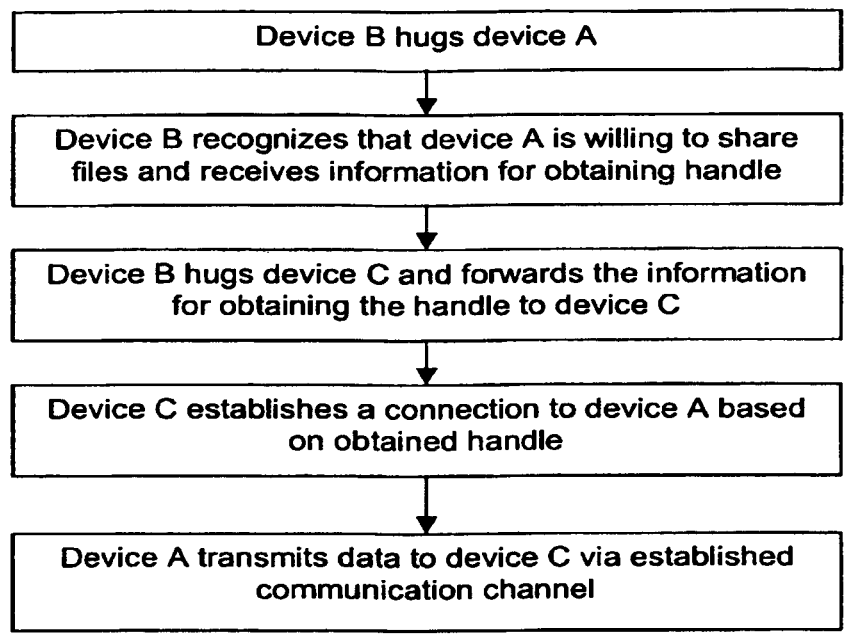
FIG. 7 is a flow chart illustrating an operation involving three devices in the embodiment of FIG. 5.

A scenario involving multiple devices for realizing a temporal, and possibly spatial, piggyback is illustrated in the flow chart of FIG. 7.

A first device A contains some files.

A second device B is used to hug device A, or vice versa, recognizes that device A is willing to share those files, and obtains handle information. The handle information include information on an address, for instance an IP address, of device A and some pointers to the actual files, for instance URLs.

Device B is then used at some later time to touch a third device C. During the touch, the handle information is forwarded by device B to device C. A functional block in an additional control logic portion in device B is responsible for obtaining the handle information from device A and for forwarding it to device C.

Device C now sets up a communication channel to device A making use of the obtained handle.

Finally, device C obtains a copy of the files identified by the pointers via the established communication channel from device A.

Figure 8:
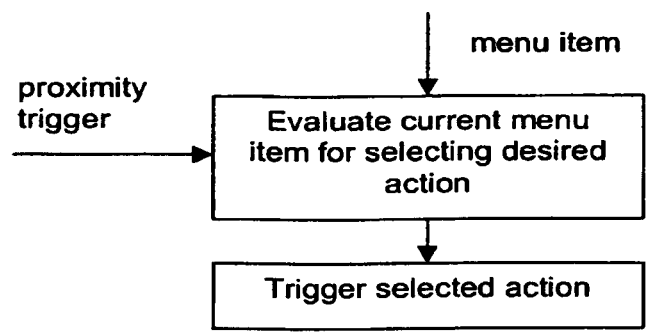
FIG. 8 is a flow chart illustrating a context based operation.

In another embodiment of the invention, the current menu item is evaluated for triggering an application, as illustrated in the flow chart of FIG. 8.

In this embodiment, the user of an electronic device selects another electronic device by simple pointing to the other device and therefore getting very small distance between the two devices. This resolves the device selection and addressing problem. Further on, an application is started automatically based on the context of the current menu item.

The device comprises a close proximity indicator which determines a close proximity to another device. Currently, there are mainly two alternatives which would suit the requirements of small devices, namely RFID and Bluetooth™ Most RFID technologies work only over the distance of a few centimeters and would thus be suited for determining a proximity between two devices. But also Bluetooth™ could be used for determining a proximity by analyzing the RSSI measurements which chipsets compliant to the Bluetooth 1.2 specifications are providing. The close proximity indicator could also be realized like the touch detection portion in the preceding embodiments. Moreover, a communication channel to another device may be created based on a handle as described for the preceding embodiments.

The device further comprises a component for triggering a desired function based on a trigger from the close proximity indicator and the current menu item. If a trigger from the close proximity indicator comes, this component evaluates the current menu item and determines the intended end user action. Such a component could also be a functional block in the additional control logic portion of the device of FIG. 5.

The function related to the intended end user action is then performed.

A potential use case is that a person takes a picture and wants to share it with another person close by. The picture is on the menu screen and a single menu item puts the device into a sharing mode. If the device now comes close enough to a second device, "sharing the picture" is recognized as desired action. The picture is then transferred automatically to the other device, as the intention to share the item with the other device is already expressed by pointing to the other device. Even the single key press to put the device into the sharing mode is not always needed, as the unintentional pointing to another device is not typical, and therefore the sharing could be triggered also without any further user interaction.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
    detecting, by an apparatus, a first hugging state indicating that the apparatus is in close proximity to physically touching a wireless device by receiving radio frequency identification signals from the wireless device including at least an address of the wireless device, wherein a working distance of the radio frequency identification signals is only within a few centimeters;
    in response to detecting the first hugging state, establishing, by the apparatus, a wireless communication channel with the wireless device;
    detecting, by the apparatus, a second hugging state while there exists the wireless communication channel with the wireless device, the second hugging state indicating that the apparatus is in close proximity to physically touching the wireless device by receiving radio frequency identification signals from the wireless device including at least the address of the wireless device, wherein a working distance of the radio frequency identification signals is only within a few centimeters, and wherein the detecting, by the apparatus, of a second hugging state is triggered automatically after the apparatus has moved beyond being in close proximity to physically touching the wireless device as indicated by the first hugging state; and
    in response to detecting the second hugging state, terminating, by the apparatus, the wireless communication channel with the wireless device.

2. The method of claim 1, wherein the wireless communication channel is established using the received address of the wireless device.

3. The method of claim 1, wherein the wireless communication channel is based on at least one of a Bluetooth communication protocol or a WLAN communication protocol.

4. The method of claim 1, wherein the wireless communication channel uses a direct link between the apparatus and the wireless device.

5. The method of claim 1, further comprising:
    detecting that a particular application of the apparatus is a foreground application that is currently selected to receive user input; and
    invoking at least one function of the foreground application once the wireless communication channel with the wireless device has been established, in order to enable the at least one invoked function to make use of the wireless communication channel.

6. The method of claim 5, wherein the invoking of the at least one function is performed in response to a user input.

7. An apparatus, comprising,
    a processor, and
    a memory including executable instructions,
    the memory and the executable instructions being configured to, in cooperation with the processor, cause the apparatus to:
    detect a first hugging state indicating that the apparatus is in close proximity to physically touching a wireless device by receiving radio frequency identification signals from the wireless device including at least an address of the wireless device, wherein a working distance of the radio frequency identification signals is only within a few centimeters;

when detecting the first hugging state, establish a wireless communication channel with the wireless device;

detect a second hugging state while there exists the wireless communication channel with the wireless device, the second hugging state indicating that the apparatus is in close proximity to physically touching the wireless device by receiving radio frequency identification signals from the wireless device including at least the address of the wireless device, wherein a working distance of the radio frequency identification signals is only within a few centimeters, and wherein the detecting of a second hugging state is triggered automatically after the apparatus has moved beyond being in close proximity to physically touching the wireless device as indicated by the first hugging state; and when detecting the second hugging state, terminate the wireless communication channel with the wireless device.

8. The apparatus of claim 7, wherein the wireless communication channel is established using the received address of the wireless device.

9. The apparatus of claim 7, wherein the wireless communication channel is based on at least one of a Bluetooth communication protocol or a WLAN communication protocol.

10. The apparatus of claim 7, wherein the wireless communication channel uses a direct link between the apparatus and the wireless device.

11. The apparatus of claim 7, wherein the memory and executable instructions are configured to, in cooperation with the processor, cause the apparatus to:

detect that a particular application of the apparatus is a foreground application that is currently selected to receive user input; and invoke at least one function of the foreground application once the wireless communication channel with the wireless device has been established, in order to enable the at least one invoked function to make use of the wireless communication channel.

12. The apparatus of claim 11, wherein the memory and the executable instructions are configured to, in cooperation with the processor, cause the apparatus to invoke the at least one function in response to a user input.

13. A computer program product comprising a non-transitory computer readable medium having computer executable code stored thereon, which when executed by a processor causes an apparatus to perform:

detecting a first hugging state indicating that the apparatus is in close proximity to physically touching a wireless device by receiving radio frequency identification signals from the wireless device including at least an address of the wireless device, wherein a working distance of the radio frequency identification signals is only within a few centimeters;

when detecting the first hugging state, establishing a wireless communication channel with the wireless device;

detecting a second hugging state while there exists the wireless communication channel with the wireless device, the second hugging state indicating that the apparatus is in close proximity to physically touching the wireless device from the wireless device by receiving radio frequency identification signals including at least the address of the wireless device, wherein a working distance of the radio frequency identification signals is only within a few centimeters, and wherein the detecting of a second hugging state is triggered automatically after the apparatus has moved beyond being in close proximity to physically touching the wireless device as indicated by the first hugging state; and when detecting the second hugging state, terminating the wireless communication channel with the wireless device.

14. The computer program product of claim 13, wherein the wireless communication channel is established using the received address of the wireless device.

15. The computer program product of claim 13, wherein the wireless communication channel is based on at least one of a Bluetooth communication protocol or a WLAN communication protocol.

16. The computer program product of claim 13, wherein the wireless communication channel uses a direct link between the apparatus and the wireless device.

17. The computer program product of claim 13, wherein the computer executable code, when executed by a processor, further cause the apparatus to perform:

detecting that a particular application of the apparatus is a foreground application that is currently selected to receive user input; and invoking at least one function of the foreground application once the wireless communication channel with the wireless device has been established, in order to enable the at least one invoked function to make use of the wireless communication channel.

18. The computer program product of claim 17, wherein the computer executable code, when executed by a processor, further cause the apparatus to perform invoking the at least one function in response to a user input.

19. An apparatus, comprising, a user interface;

an RFID chip configured to detect a first hugging state indicating that the apparatus is in close proximity to physically touching a wireless device by receiving radio frequency identification signals from the wireless device including at least an address of the wireless device, wherein a working distance of the radio frequency identification signals is only within a few centimeters; and a link creation portion configured to, when the first hugging state has been detected, establish a wireless communication channel with the wireless device, wherein the RFID chip is further configured to detect a second hugging state while there exists the wireless communication channel with the wireless device, the second hugging state indicating that the apparatus is in close proximity to physically touching the wireless device by receiving radio frequency identification signals from the wireless device including at least the address of the wireless device, wherein a working distance of the radio frequency identification signals is only within a few centimeters and wherein the detecting of a second hugging state is triggered automatically after the wireless device has moved beyond being in close proximity to physically touching the apparatus as indicated by the first hugging state; and wherein the link creation portion is further configured to, when the second hugging state has been detected, terminate the wireless communication channel with the wireless device.

20. The apparatus of claim 19, wherein the wireless communication channel is established using the received address of the wireless device.

21. The apparatus of claim 19, wherein the wireless communication channel is based on at least one of a Bluetooth communication protocol or a WLAN communication protocol.

22. The apparatus of claim 19, wherein the wireless communication channel uses a direct link between the apparatus and the wireless device.

23. The apparatus of claim 19, wherein the apparatus is configured to:
   detect that a particular application of the apparatus is a foreground application that is currently selected to receive user input via the user interface; and
   invoke at least one function of the foreground application once the wireless communication channel with the wireless device has been established, in order to enable the at least one invoked function to make use of the wireless communication channel.

24. The apparatus of claim 23, wherein the apparatus is further configured to invoke the at least one function in response to a user input.

\* \* \* \* \*